US009055117B1

(12) United States Patent
Dickinson et al.

(10) Patent No.: US 9,055,117 B1
(45) Date of Patent: Jun. 9, 2015

(54) DISTRIBUTED NETWORK ADDRESS TRANSLATION

(75) Inventors: Andrew B. Dickinson, Seattle, WA (US); Arijit Ganguly, Kirkland, WA (US); Benjamin Tobler, Seattle, WA (US); Faisal M. Bhamani, Seattle, WA (US); Christopher J. Lefelhocz, Bothell, WA (US); Colin J. Whittaker, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 735 days.

(21) Appl. No.: 13/246,532

(22) Filed: Sep. 27, 2011

(51) Int. Cl.
*G06F 15/16* (2006.01)
*H04L 29/12* (2006.01)
(52) U.S. Cl.
CPC ........ *H04L 61/2517* (2013.01); *H04L 61/2557* (2013.01); *H04L 61/2503* (2013.01)
(58) Field of Classification Search
CPC ............ H04L 61/2503; H04L 61/2514; H04L 61/2517; H04L 61/2519; H04L 67/1002; H04L 67/1036; H04L 61/2557
USPC ................... 370/351, 389, 392, 400; 709/245
See application file for complete search history.

(56) References Cited

U.S. PATENT DOCUMENTS

| 6,353,614 | B1 * | 3/2002 | Borella et al. | 370/389 |
| 8,289,968 | B1 * | 10/2012 | Zhuang | 370/392 |
| 8,725,898 | B1 * | 5/2014 | Vincent | 709/245 |
| 2002/0075844 | A1 * | 6/2002 | Hagen | 370/351 |
| 2010/0061380 | A1 * | 3/2010 | Barach et al. | 370/400 |

* cited by examiner

*Primary Examiner* — Dustin Nguyen
(74) *Attorney, Agent, or Firm* — Knobbe, Martens, Olson & Bear, LLP

(57) ABSTRACT

Systems and methods are disclosed that facilitate the management of network address information utilized by hosted computing devices. Each host computing device includes a local network and port address management component that is configured with port address translation information for the specific host computing device. Additionally, one or more edge computing devices also include a local network and port address management component that is configured with network and port address translation information. The network and port address translation information facilitates the correlation of internal network address information associated with a virtual machine instance with a tuple of an externally accessible network address and port address information. The local network and port address translation management components utilize the network and port address translation information to translate communication requests to and from the virtual machine instances without requiring a centralized network and port address translation component.

21 Claims, 6 Drawing Sheets

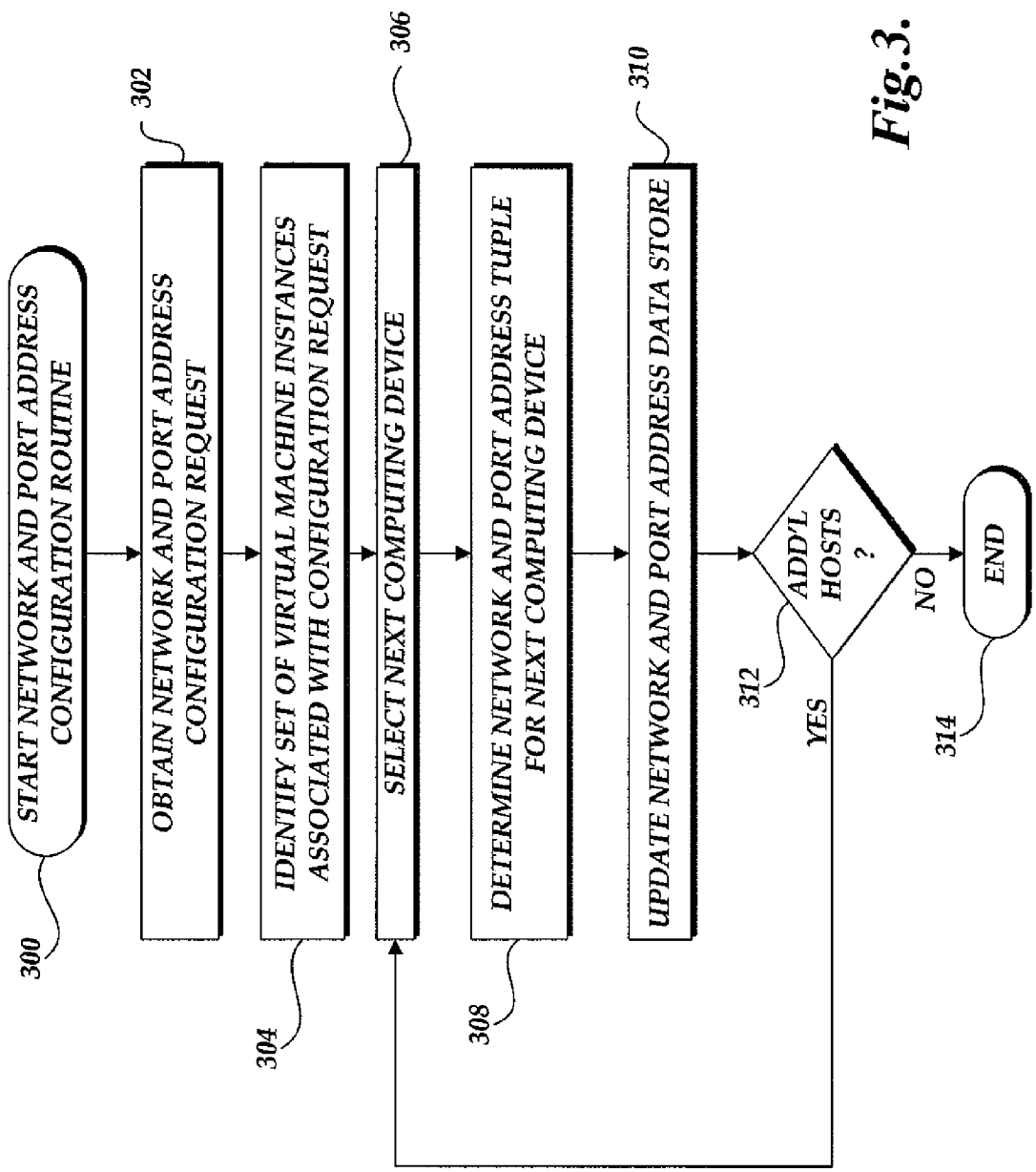

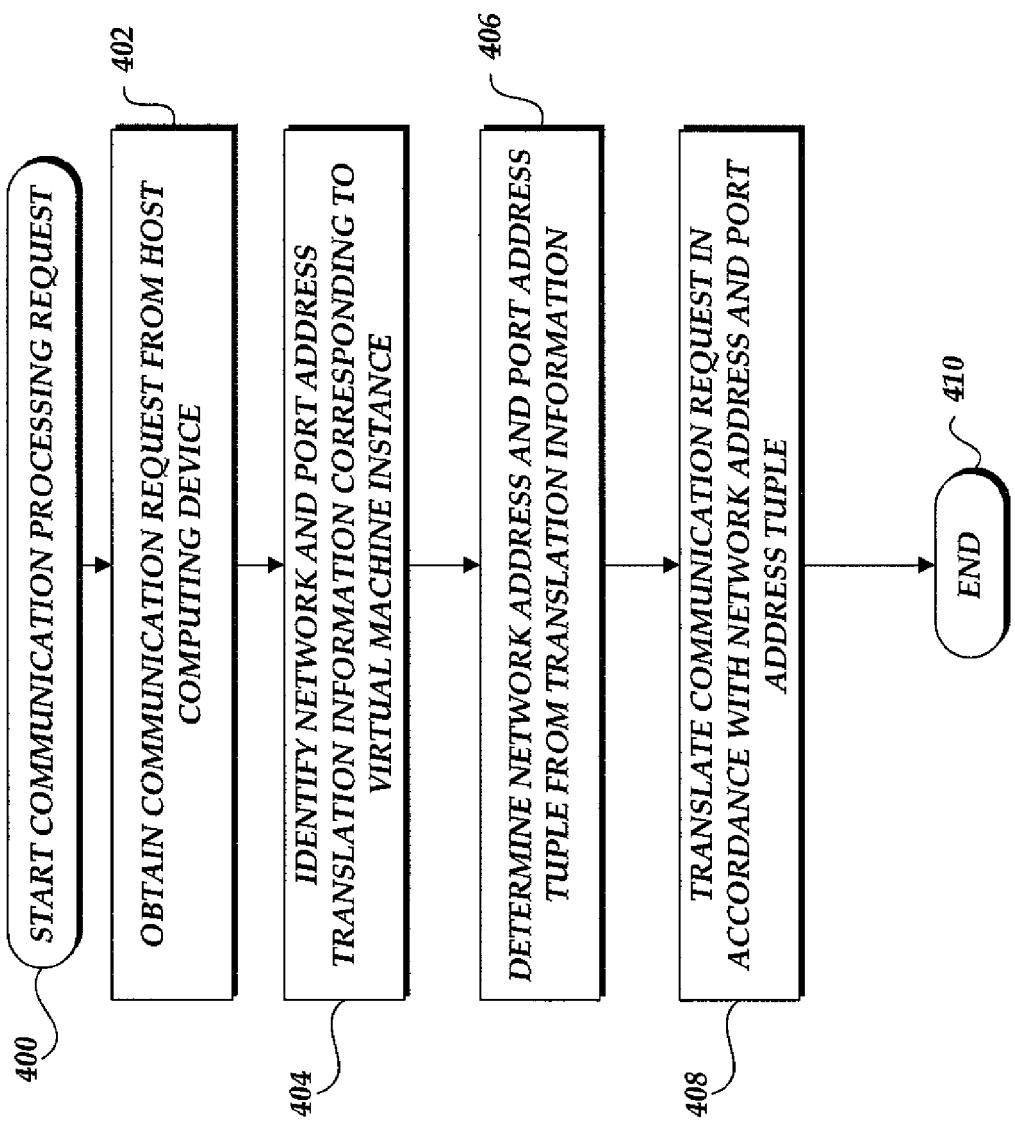

DISTRIBUTED NETWORK ADDRESS TRANSLATION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In embodiments in which a user (e.g., a customer of the service provider) utilizes a number of networked computing devices, such as a hosted virtual machine network, each networked computing device is typically associated with an externally accessible network address. For example, each networked computing device can be associated with an Internet Protocol ("IP") address conforming to the Internet Protocol version 4 ("IPv4") communication protocol. However, a service provider may often be limited in terms of the number of externally accessible network addresses that are available for the networked computing devices. Accordingly, service providers can implement various types of network address translation techniques, generally referred to as Network Address Translation ("NAT").

In a typically NAT implementation, a service provider can assign each computing device in a hosted network internal, private network addresses that facilitate communication within the hosted network. The service provider then implements a centralized NAT computing device that can correlates a finite set of external network addresses to each of the computing devices in the hosted network. The centralized NAT computing device operates as a gateway translating communications between the internal, private network address of the computing devices in the hosted network and the finite set of externally accessible network addresses. However, centralized NAT devices can be a centralized point of failure for a hosted network and can have difficulty managing large number of communication connections typically associated in larger hosted networks.

BRIEF DESCRIPTION OF THE DRAWINGS

The foregoing aspects and many of the attendant advantages will become more readily appreciated by reference to the following detailed description, when taken in conjunction with the accompanying drawings, wherein:

FIG. 3 is a flow diagram illustrative of a network and port address information configuration routine implemented by a network and port address translation management component; and FIG. 4 is a flow diagram illustrative of a communication request processing routine implemented by a targeted script management component.

DETAILED DESCRIPTION

Figure 1:
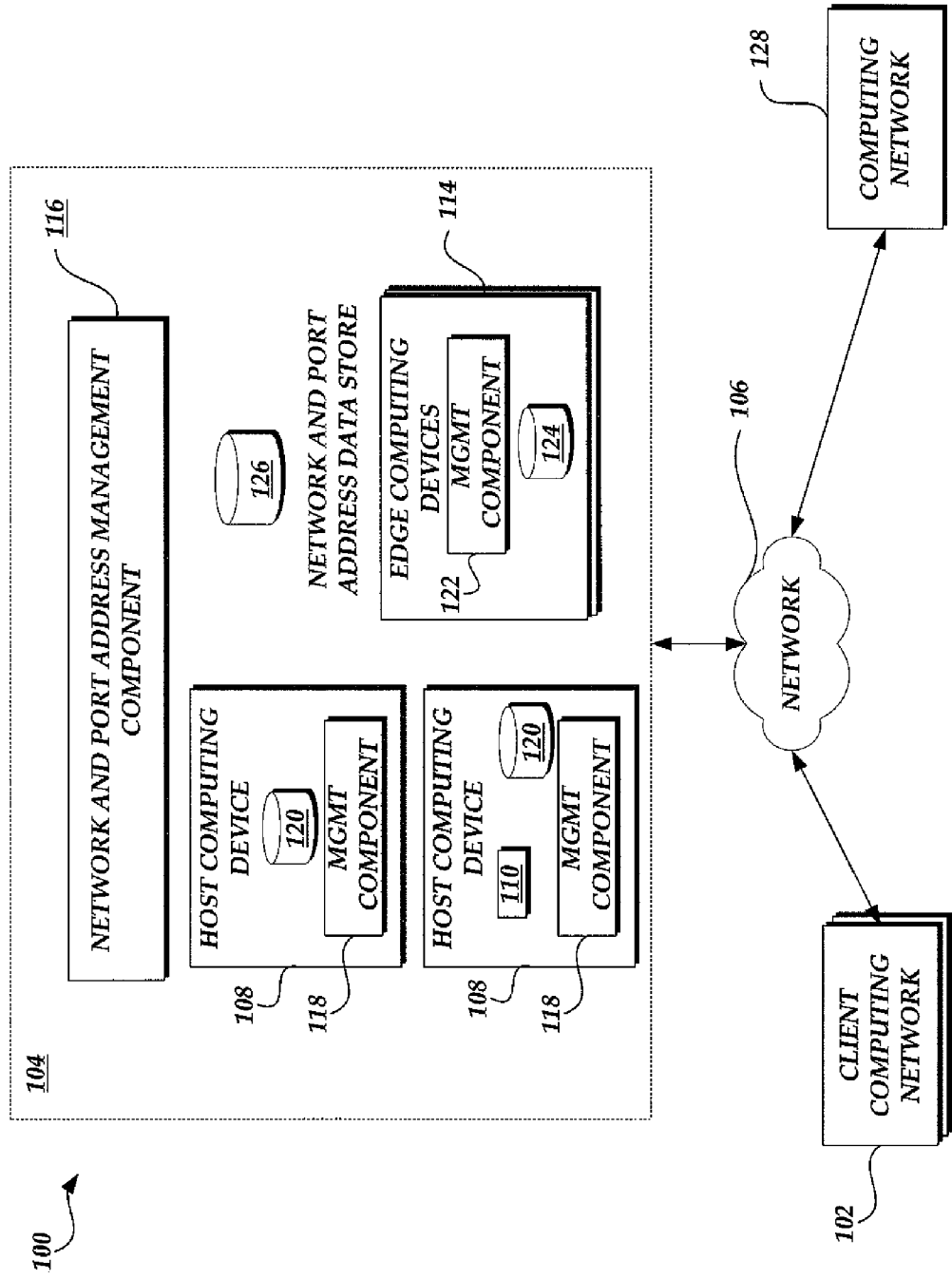
FIG. 1 is a block diagram depicting an illustrative of a virtual network environment for managing virtual machine instance types including a number of computing device networks, a number of host computing devices, and a network and port address translation management component.

Generally described, aspects of the present disclosure relate to the management of communications associated hosted computing devices. Specifically, systems and methods are disclosed that facilitate the management of network address information utilized by hosted computing devices. In one embodiment, a hosted virtual network can include host computing devices and edge computing devices that utilize network and port address translation information to facilitate communication to and from virtual machine instances hosted on the specific host computing device.

Illustratively, the network and port address translation information facilitates the correlation of internal network address information associated with a virtual machine instance with a tuple of an externally accessible network address and network and port address. In one aspect, for a hosted virtual machine network, one or more virtual machine instances may be configured with internal network address and other identifier information that facilitates communication with other components of the hosted virtual machine network. To exchange data with components external to the hosted virtual network, the virtual machine instances (or other computing devices) originate messages associated with internally assigned network addresses and port address identifier information selected from a range of available port address identifiers for the hosted virtual network. Edge computing devices in the hosted virtual network receive communication requests from the virtual machine instances. The edge computing devices utilize network and port address translation information to translate the communication request to correspond to a common IP address for purposes of external network communications. The external communication request also includes the port identification information.

In another aspect, external communications to the virtual machine instances sharing the common IP address can be distinguished by edge computing devices in the hosted virtual machine network by specifying specific port address information for each virtual machine instance. For example, assume two virtual machine instances are configured with same external network address (e.g., 128.227.1.1). Additionally, assume that each virtual machine instance is provided 8-bits of freedom (e.g., 256 ports) for establishing communication channels. Each virtual machine instance can be defined in terms of a network address and port address tuple. By way of illustrative example, the first virtual machine instance can be defined by the network address and port address tuple, e.g., 128.227.1.1:4096-4351. Similarly, the second virtual machine instance can be defined by a different network address and port address tuple, e.g., 128.227.1.1:4351-4657. Because the two virtual machine instances in the example share a common network address (e.g., 128.227.1.1), the local network address and port address management component in the edge computing device can identify an appropriate virtual machine instances based on a port address selected from the range of port addresses associated with each virtual machine instance.

Accordingly, the local network and port address translation management component utilizes the network and port address translation information to translate communication requests to and from the virtual machine instances on the host computing device in a distributed manner and without requiring a centralized network and port address translation component. Additionally, for some virtual machine instances that will not likely utilize external network communications, the virtual network can allocate a common external address to these devices (distinguished by port address identifiers/addresses). Still further, client computing device networks or service providers, can provide varying ranges of port addresses, generally referred to as port compression, based on availability of network addresses, financial criteria, and the like.

Illustratively, the present disclosure will be discussed with regard to illustrative architectures and interaction between virtual machine instances hosted on host computing device. However, one skilled in the relevant art will appreciate that the present disclosure may be applicable to networks including physical computing devices only or a combination of host computing devices and physical computing devices. Additionally, although the present disclosure will be discussed with regard to various addressing protocols utilized in conjunction with data packet delivery via the wireless communication networks including the Internet Protocol version 4 ("IPv4"), one skilled in the relevant art will appreciate that the present disclosure is not limited to any particular network addressing protocol.

FIG. 1 is a block diagram illustrating an embodiment of a virtual network environment 100. The virtual network environment 100 includes one or more client computing device networks 102 in communication with a virtual network 104 via a communication network.

In one embodiment, the client computing device networks 102 can correspond to one or more computing devices that are controlled on or behalf of a user (such as a system administrator). The communication network 106 may be, for instance, a wide area network (WAN), a local area network (LAN), or a global communications network. For purposes of an illustrative embodiment, the client computing device networks 102 can correspond to customers of the virtual network 104 for requesting instantiation of hosted virtual network components. The virtual network environment 100 can also include The virtual network 104 can include multiple physical computing devices, generally referred to as host computing devices 108. In one embodiment, the host computing devices 108 are capable of hosting multiple virtual machine instances 110. At least some of the virtual machine instances 110 may be provisioned to provide a variety of different desired functionalities depending on the needs of the service provider providing the virtual network 104 or of the client computing device networks 102 utilizing the virtual network. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 104 is logical in nature and can encompass host computing devices 108 from various geographic regions. Additionally, although the host computing devices 108 will be discussed with regard to hosted virtual machine instances 110, one or more of the host computing devices 108 may be physical machines configured to provide specified functionality in the virtual network 104 without hosting virtual machine instances 110, generally illustrated as host computing device 108 without virtual machine instances 110 in FIG. 1. Accordingly, reference in the illustrative examples and embodiments to host computing devices 108 or host computing device can include host computing devices hosting virtual machines 110 or not hosting virtual machine instances.

The virtual network 104 also includes a network address and port address management component 116 for processing configuration requests submitted by client computing device networks 102 to configure network address and port address information for virtual machine instances on the host computing devices 108 (or for the host computing devices). As illustrated in FIG. 1, the network address and port address management component 116 is a centralized component of the virtual machine network 104 for obtaining client configuration requests and forwarding the requests to a local network and port address management component associated with a specified host computing device 108. It should be appreciated that, although the network address and port address management component 116 is depicted for the purpose of example as a single, stand alone logical component in illustrative FIG. 1, the routines and steps performed by the network address and port address management component 116 may be distributed among any number of components and executed in hardware or software. For example, multiple network address and port address management components 116 may be implemented in the virtual network 104. Additionally, although the network address and port address management component 116 is illustrated as logically associated within the virtual network 104, the network address and port address management component 116 may be implemented in a separate networked environment, in conjunction with client computing device networks 102, or otherwise integrated into other components/systems of the virtual network 104. Still further, in other embodiments, the network address and port address management component 116 may be omitted altogether as will be explained in greater detail below.

In addition to the network address and port address management component 116, each host computing device 108 includes a local network address and port address management component 118. In one aspect, the local network address and port address management component 118 interfaces with the network address and port address management component 116 to obtain client configuration requests. In another aspect, the local network address and port address management component 118 processes communication requests to and from virtual machine instances 110 in accordance with network address and port address information.

The virtual network 104 also includes a number of edge computing devices 114 for processing communication requests between host computing devices 108 and one or more components external to the virtual network 104. The edge computing devices 114 may correspond to any one of a number of computing devices for facilitating communications, or combination thereof. Additionally, one or more of the edge computing devices 114 may be implemented in a virtualized environment as virtual machine instances on a host computing device. Illustratively, each edge computing device also includes a local network address and port address management component 122. In one aspect, the local network address and port address management component 122 interfaces with the network address and port address management component 116 to obtain client configuration requests. In another aspect, the local network address and port address management component 122 processes communication requests to and from virtual machine instances 110 in accordance with network address and port address information.

With continued reference to FIG. 1, the virtual network 104 can further include a network and port address data store 126 for maintaining, at least in part, network and port address information related to host computing devices 108. As illustrated in FIG. 1, each local network address and port address management component 118 and edge computing device 114 can also include at least a portion of the network and port address data store 126 as local network and port address data store 120, 124 for processing communications associated with hosted virtual machine instances. Illustratively, the network and port address data store 126 and local network and port address data store 120, 122 correspond to network attached storage (NAS), database servers, local storage, or other storage configurations which may be implemented in a centralized or distributed manner.

Illustratively, the network address and port address management component 116 or local network address and port address management components 118, 126 may be associated with computing resources such as central processing units and architectures, memory, mass storage, graphics processing units, communication network availability and bandwidth, etc. Generally, however, the network address and port address management component 116 and local network address and port address management components 118, 122 may include one or more processing units, such as one or more CPUs. The network address and port address management component 116 and local network address and port address management components 118, 122 may also include system memory, which may correspond to any combination of volatile and/or non-volatile storage mechanisms. The system memory may store information that provides an operating system component, various program modules, program data, or other components. The network address and port address management component 116 and local network address and port address management components 118, 122 performs functions by using the processing unit(s) to execute instructions provided by the system memory. The network address and port address management component 118, 122 and local network address and port address management components 118, 122 may also include one or more types of removable storage and one or more types of non-removable storage. Still further, the network address and port address management component 118, 122 and local network address and port address management components 118, 122 can include communication components for facilitating communication via wired and wireless communication networks, such as communication network 106.

Figure 2A:
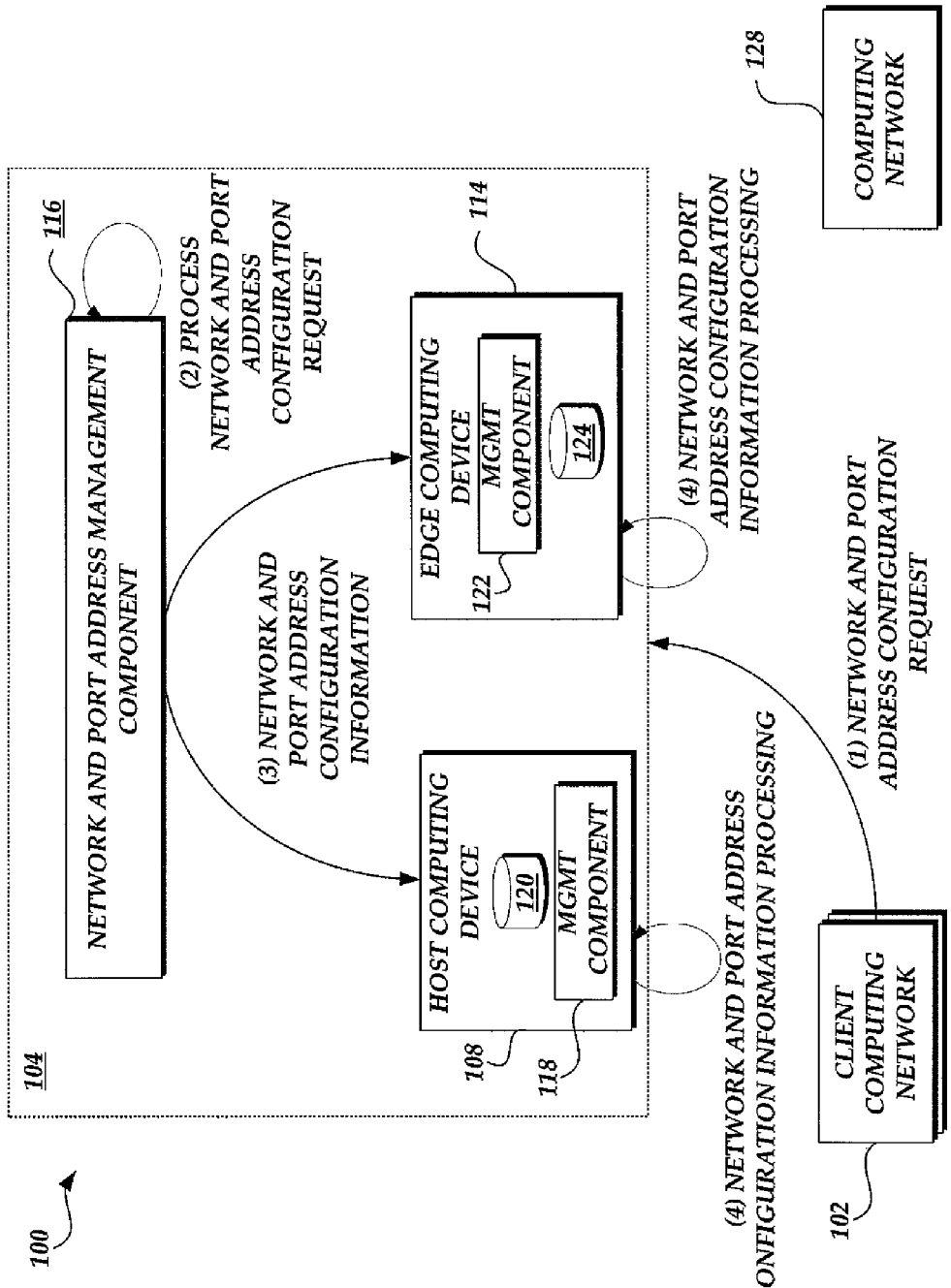
FIGS. 2A-2C are simplified block diagrams of the virtual network environment of FIG. 1 illustrating the configuration and implementation of network and port address translation information on one or more host computing devices having local network and port address translation management components.
Figure 2B:
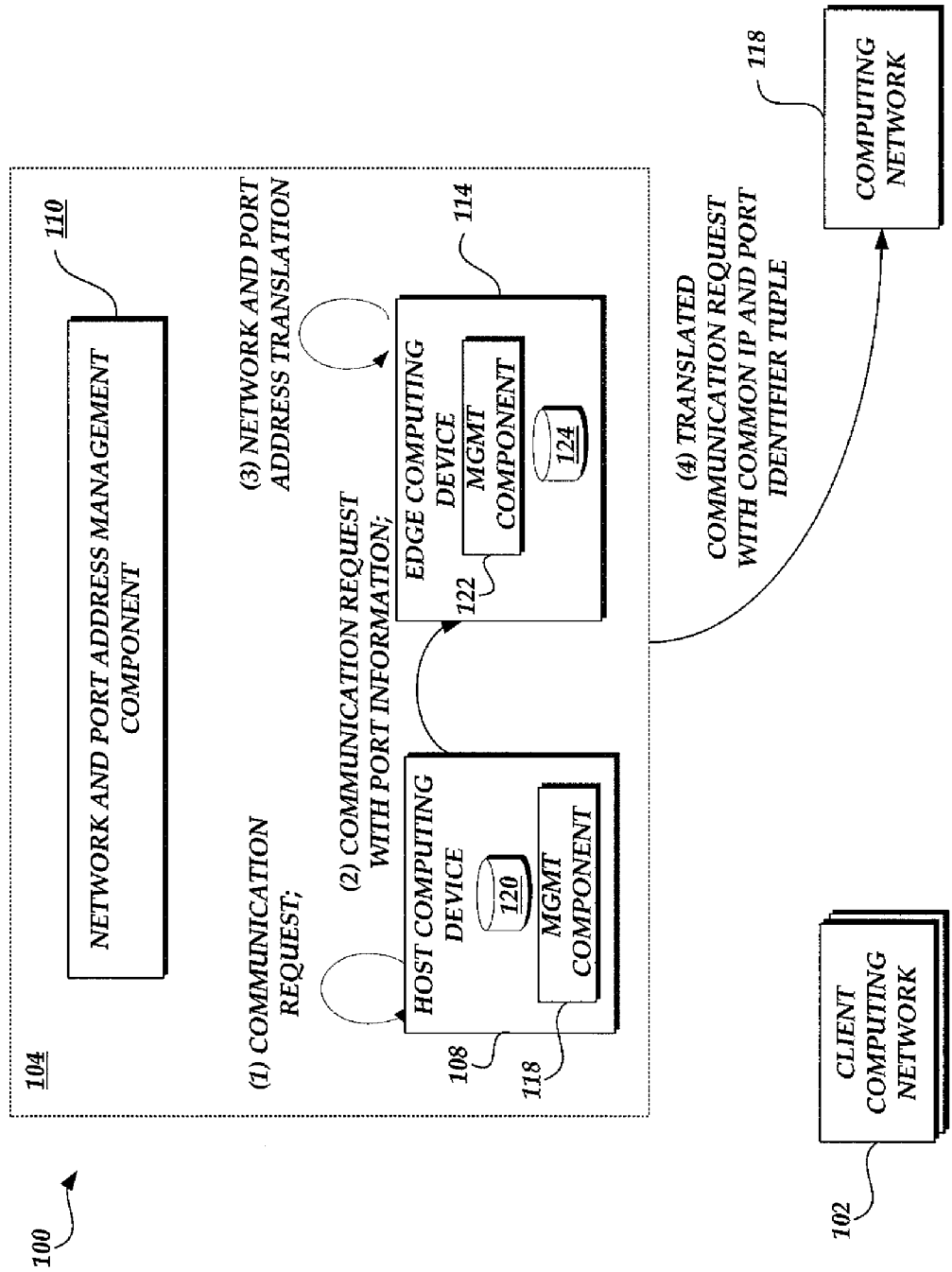
Figure 2C:
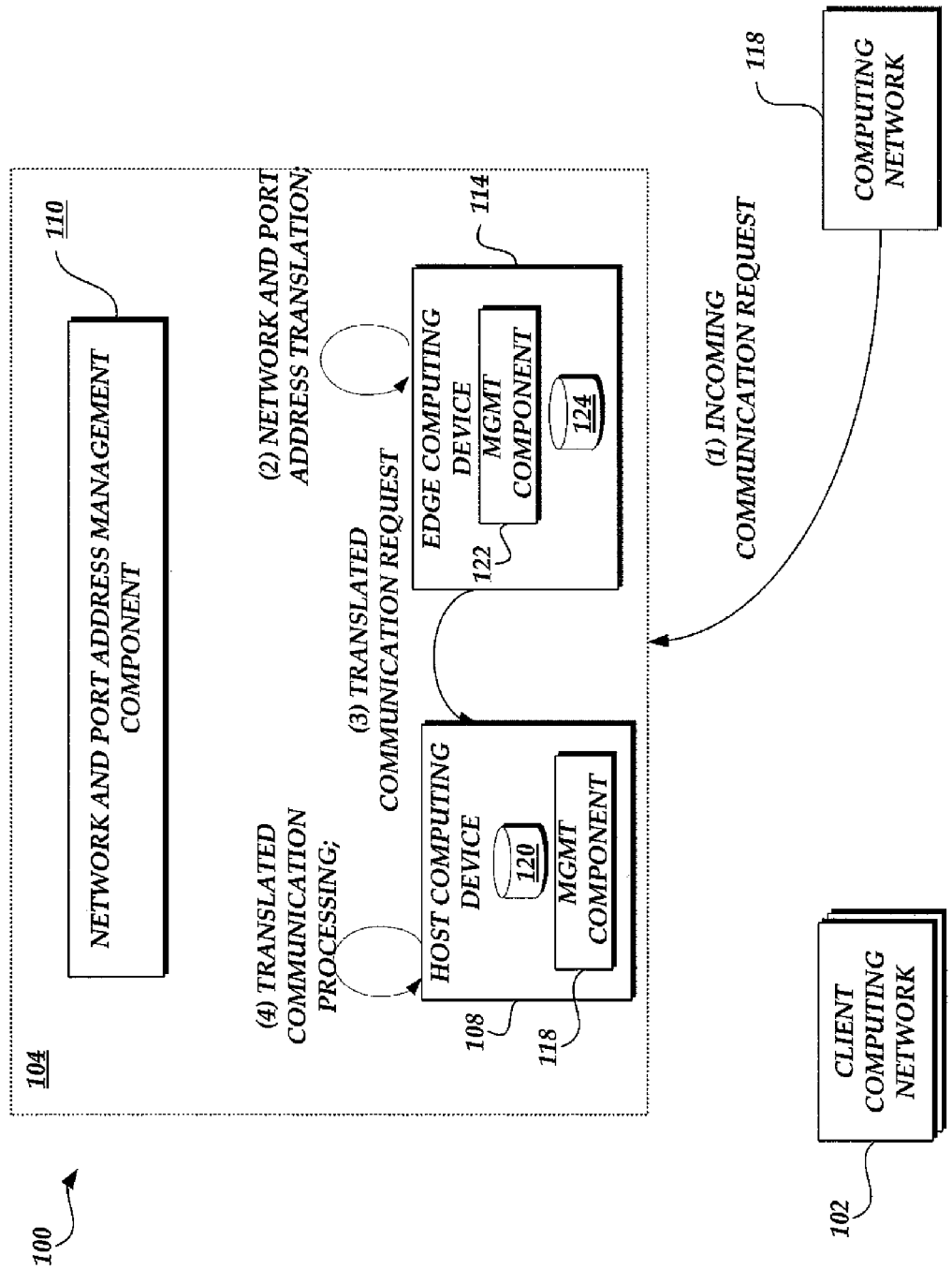

Turning now to FIGS. 2A-2C, a simplified block diagram of the virtual network environment 100 of FIG. 1 illustrating the configuration and processing of client configuration requests on one or more host computing devices 108 will be described. For purposes of illustration, many of the components of the virtual network environment 100 have been omitted. However, one skilled in the relevant art will appreciate that the illustrated interaction between components may utilize the omitted components or additional components not previously illustrated in FIG. 1.

With reference to FIG. 2A, in one embodiment, the client computing network 102 can initiate a request to the network address and port address management component 116 to authorize or request the configuration of network address and port address information for one or more hosted computing devices 108 or edge computing devices 114 associated with the client computing device network 102 (1). The request can identify one or more specific, instantiated host computing device(s) 108 or be made in conjunction with a request to instantiate one or more host computing device(s). Additionally, the request can also identify one or more edge computing devices 114 or be made in conjunction with a request to instantiate one or more edge computing devices. In one embodiment, the configuration of network address and port address information can include the specification or request of an external network address that will be assigned to host computing device. For example, an administrator associated with a client computing network 102 may be presented with an interface (e.g., a graphical user interface) that identifies network addresses that could be utilized by the client computing network 102. In another example, the client computing network 102 can also specify a selected external network address by identification of network address information in accordance with an Application Programming Interface ("API") call.

In another embodiment, the configuration of the network address and port address information may include the specification as to the number of hosted computing devices 108 that will share a specified external network address. As previously discussed, multiple host computing devices 108 assigned to a shared external network address are distinguished by associating each host computing device with port address information. More specifically, each host computing device 108 can be configured to correspond to a defined range of the available port addresses. By way of illustrative example, one skilled in the relevant art will appreciate that some networking protocols, such as Transport Control Protocol ("TCP") or User Datagram Protocol ("UDP") utilize a 16 bits integer to define port address information utilized to establish communication channels, generally referred to as sockets in conjunction with a network address. Accordingly, for each network address, there could be up to 65,535 ($2^{16}$) different combinations of network address and port address. In accordance with this embodiment, however, each computing device or instance associated with a common network address can be associated with a range of the total available port addresses in which the overall size of the range would represent that potential number of simultaneous connections any virtual machine instance can maintain. For example, utilizing 8-bits to define port address ranges would allow each virtual machine instance up to 256 simultaneous connections, while utilizing 12-bits to define port address ranges would allow each virtual machine instance up to 4,096 simultaneous connections. As such, a service provider associated virtual network 104 may implement different pricing plans depending on the size of the port address ranges a client computing network 102 is willing to accept for host computing devices 108 or virtual machine instances 110.

One skilled in the relevant art will appreciate, however, that the client configuration request can be directly transmitted to a local network address and port address management component on the host computing devices 108 or edge computing devices 114.

Based on the received request, the network address and port address management component 116 processes the network and port address configuration request (2). In one embodiment, the processing of the network and port address configuration request can corresponds to the identification of one or more host computing devices 108 and their corresponding local network address and port address management components 118 or edge computing devices and their corresponding local network address and port address management components 122 that will receive the client configuration request. In another embodiment, the processing of the network and port address configuration request can include the determination of network address and port address information for each host computing device 108 or edge computing device 114 corresponding to the client configuration request. In this embodiment, the network address and port address management component 116 may conduct some additional processing, such as the selection of a network addresses from a set of network addresses. For example, if the client computing network 102 did not (or was not allowed to) select a network address, the network address and port address management component 116 can select a network address that corresponds to the level port address ranges (e.g., port address compression) selected by the client computing network 102.

In another aspect, the network address and port address management component 116 may select a range of port address from available ranges of port addresses for a set of host computing devices 108 (including virtual machine instances 110 hosted on the host computing devices 108) sharing a common external network address. One skilled in the relevant art will appreciate that some ranges of port addresses may be reserved for specific functions (e.g., port 25 for incoming Simple Mail Transfer Protocol ("SMTP") requests). As such, the network address and port address management component 116 can ensure that some ranges of port addresses are not assigned. The network address and port address management component 116 can then store any of the network address and port address information obtained in the client configuration request or otherwise generated based on the processing of the client configuration request.

With continued reference to FIG. 2A, the network address and port address management component 116 can then transmit the appropriate client configuration request (or portion thereof) to one or more local network address and port address management component 118 on selected host computing devices 108 or to the local network address and port address management component 122 on selected edge computing devices 114 (3). Based on the receipt of the client configuration request, the respective local network address and port address management components 118, 122 processes the network address and port address information. Illustratively, the local network address and port address management components 118, 122 can complete some or all of the processing previously described with regard to the network address and port address management component 116. The local network address and port address management components 118, 122 can also store locally maintained network address and port address information, such as an IP table. A description of the utilization of the network address and port address information will be described with regard to FIGS. 2B and 2C.

Turning now to FIG. 2B, during the execution of the virtual machine instances on the hosted computing device 108, one or more of the virtual machine instances can generate communication requests to components external to the virtual network 104 (1). As previously described, each virtual machine instance can be associated with an internal, private network address that facilitates communications to the virtual machine instances within the virtual network 104. However, the internal, private network address is not typically available to direct communications with external components, such as computing network 118.

In accordance with an illustrative embodiment, the local network address and port address management component 118 processes the communication request by including in the communication request port address information associated with the virtual machine instance 110 generating the communication request (2). The port address information can be selected from a range of port address identifiers allocated to the components of the hosted virtual network. From the perspective of the virtual machine instances 110 and host computing devices 108 the outgoing communication request still identifies the private, local network address of the virtual machine instance.

Upon receipt of the communication request including the specified port address identifier, a receiving edge computing device 114 processes the communication request and translates the communication (3). Illustratively, the translation of the communication request relates to the modification of information identifying the originating network address of the transmitting device to correspond to the external network address associated with the virtual machine instance. Additionally, the translation of the communication request also includes the port address identification information corresponds the transmitting virtual machine instance 110 to correspond to the port address correlated to the virtual machine instance or selecting one of a range of possible port addresses. One skilled in the relevant art will appreciate, however, that the translation of the communication request does not require the utilization of a central translation component, such as a port address translation component. Accordingly, the translation of the communication request can be distributed throughout at least portions of the virtual network 104 to one or more edge computing devices 114.

The receiving edge computing device 114 then causes the transmission of translated communication request to the destination (4). Although not illustrated in FIG. 2B, the transmission of the translated communication request can include the utilization of a number of additional components of the virtual network 104.

With reference now to FIG. 2C, at some point, a computing network 118 can generate communications that are received at an edge computing device 114 and which identify the external network address and port address of a virtual machine instance (1). As previously described, in some embodiments, multiple virtual machine instances on a host computing device 108 may share a common network address, such as in hosted virtual machine network. Based on the received communication, a corresponding local network address and port address management component 122 on the edge computing device 114 processes the communication request by translating the incoming communication request (2). Specifically, in one embodiment, the local network address and port address management component 122 can modify the information identifying the destination address of the communication request to the internal, private network address of a virtual machine instance corresponding to the specified network address and port address in the incoming communication request.

Once the communication request has been translated, the communication request is transmitted to a corresponding virtual machine instance (3). In this embodiment, the receiving virtual machine instance does not need to be aware of the shared external network address or assigned port address that is used to facilitate communication. The received communication can be processed by the receiving virtual machine instance 110 (4).

Turning to FIG. 3, a flow diagram illustrative of a network address and port address configuration routine 300 implemented by local network address and port address management component 118 or local network address and port address management component 122 will be described. While routine 300 will be described with regard to implementation by the local network address and port address management component 118 or local network address and port address management component 122, one skilled in the relevant art will appreciate that routine 300, or some portion thereof, may be implemented other components of the virtual network 104. For example, one or more of aspects of routine 300 may be implemented by the network address and port address management component 116.

At block 302, the local network address and port address management component obtains a client configuration request. In one embodiment, the request can be transmitted by a client computing network 102. As previously described, the request can identify one or more specific host computing devices 108 or virtual machine instances that need to be configured. The request can be transmitted in accordance with an API call. Additionally, the client configuration request can also include criteria that specify types or groups of virtual machine instances and that can be used by the local network address and port address management component 118, 122 to select specific virtual machine instances to configure. For example, the client configuration request may include a specification of a class of virtual machine instances (e.g., all database servers). Still further, the client configuration request can include criteria specifying a minimum, maximum or other threshold number of simultaneous connections that each host computing device 108 can maintain. Similarly, the client configuration request can further specify different financial cost criteria that may be utilized in selection of ranges of port address information.

At block 304, the local network address and port address management component identifies one or more virtual machine instances that will be configured. At block 306, routine 300 implements a loop in which all the identified virtual machine instances will be configured on all host computing devices 108. Accordingly, the next host computing device 108 is selected as the next computing device. At block 308, the local network address and port address management component determines a network and port address tuple for each virtual machine instance hosted in a specific host computing device 108. As previously described, the local network address and port address management component may conduct some additional processing, such as the selection of a network addresses from a set of network addresses. In another example, the local network address and port address management component may select a port address range from available range of port addresses that has been selected for a set of host computing devices 108 sharing a common network address. As previously described, each host computing device 108 (or virtual machine instance 110) will be distinguish from other host computing devices 108 sharing the same network address based on port addresses selected from the allocated range of port addresses.

At block 310, the local network address and port address management component can then store any of the network address and port address information obtained in the client configuration request or otherwise generated based on the processing of the client configuration request. Additionally, at block 310, the local network address and port address management component can cause the distribution of the network address and port address information to one of the data stores. At decision block 312, a test is conducted to determine whether additional virtual machine instances need to be configured or whether additional host computing devices need to be configured. If so, routine 300 returns to block 306. Alternatively, routine 300 terminates at block 314.

Turning to FIG. 4, a flow diagram illustrative of a communication processing routine 400 implemented by the local network address and port address management component 122 of the edge computing device will be described. As previously described, although routine 400 will be described with regard to communication requests from a virtual machine instance, one skilled in the relevant art will appreciate that at least aspects of routine 400 can be implemented in accordance with host computing devices 108 that correspond to physical computing devices not implementing any virtual machine instances.

At block 402, the local network address and port address management component 122 obtains a communication request from a hosted virtual machine instance. As previously described, each virtual machine instance can be associated with an internal, private network address that facilitates communications to the virtual machine instances within the virtual network 104. However, the internal, private network address is not typically available to direct communications with external components, such as computing network 118.

At block 404, the local network address and port address management component 122 of the edge device 114 identifies network address and port address information that corresponds to the communication request. At block 406, the local network address and port address management component 122 then identifies a specific network address and port address tuple that will be utilize to translate the communication request. As previously described, the local network address and port address management component 122 can process the communication request to generate some portion of the network address or port address information from a set of available network address or port address information. For example, the local network address and port address management component 122 can select from a range of port address information.

At block 408, the local network address and port address management component 122 translates the communication request. Illustratively, the translation of the communication request relates to the modification of information identifying the originating network address of the transmitting device to correspond to the external network address associated with the virtual machine instance. Additionally, the translation of the communication request also relates to the modification of information specifying a port address of the transmitting device to correspond to the port address correlated to the virtual machine instance or selecting one of a range of possible port addresses. At block 410, the routine 400 terminates.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing communications for host computing devices, comprising:
    a first computing device, the first computing device operable to host one or more virtual machine instances, wherein the first computing device includes a first network and port address translation component, the first network and port address translation component for associating a communication request initiated by the one or more virtual machine instances hosted on the first computing device with port identifier information from a range of port address identifiers allocated to each of the one or more virtual machine instances hosted on the first computing device; and
    a second computing device for transmitting communications received from the first computing device to an external computing device outside the system, the second computing device includes a second network and port address translation component, the second network and port address translation component for translating the communication request from the first computing device by associating an externally accessible Internet Protocol address and a port address corresponding to the port identifier information of the one or more virtual machine instances hosted on the first computing device;
    wherein the network and port address translation components on the first and second host computing devices configure the Internet Protocol address and port identifier information in accordance with customer configuration requests.

2. The system as recited in claim 1, wherein the customer configuration requests correspond to application programming interface calls.

3. The system as recited in claim 1 further comprising a central network and port address translation management component for processing customer configuration requests and transmitting the customer configuration requests to a network and port address translation component on a host computing device.

4. A system for managing communications for host computing devices, comprising:
    a first computing device, wherein the first computing device includes a first network and port address translation component, the first network and port address translation component for associating port identifier information selected from a first range of port address information with one or more virtual machine instances hosted on the first computing device;
    a second computing device, wherein the second computing device includes a second network and port address translation component, the second network and port address translation component for associating port identifier information selected from a second range of port address information with one or more virtual machine instances hosted on the second computing device; and
    a third computing device for receiving communications for the first and second computing devices, the third computing device includes a third network and port address translation component, the third network and port address translation component for associating an externally accessible network address information and a port address with the one or more virtual machine instances hosted on the first or second computing device based on corresponding port identifier information;
    wherein the externally accessible network address information associated with the first and second host computing device is the same and wherein the first range of port address information and the second range of port address information are different.

5. The system as recited in claim 2, wherein the externally accessible network address information corresponds to Internet Protocol address.

6. The system as recited in claim 2, wherein the externally accessible network address information is selected from a finite set of network addresses, wherein a number of network addresses in the finite set of network addresses is less than a number of host computing devices.

7. The system as recited in claim 2, wherein the externally accessible network address and port identifier information is configured in accordance with customer configuration requests.

8. The system as recited in claim 7, wherein the customer configuration requests correspond to application programming interface calls.

9. The system as recited in claim 7, wherein the customer configuration request specify financial criteria utilized to selection the first and second range of port address information.

10. The system as recited in claim 2, wherein the third network and port address translation components on the third computing device translates communication requests from the one or more virtual machine instances hosted on the first or second computing device in accordance with the externally accessible network address and port identifier information.

11. The system as recited in claim 2 further comprising a central network and port address translation management component for processing customer configuration requests and transmitting the customer configuration requests to a network and port address translation component on a host computing device.

12. The system as recited in claim 2 further comprising a network and port address translation data store associated with the first computing device, the network and port address translation data store for maintaining at least port identifier information for the first computing device.

13. The system as recited in claim 2 further comprising a network and port address translation data store associated with the second computing device, the network and port address translation data store for maintaining at least port identifier information for the second computing device.

14. A method for managing communications associated with host computing devices, comprising:
    obtaining a network and port address configuration request, the network and port address configuration request defining a network and port address information for a set of computing devices;
    identifying one or more computing devices corresponding to the network and port address configuration request;
    for each identified computing device,
        determining a network address and port address tuple to be transmitted to the identified computing device, wherein network address and port address tuples of the identified set of host computing devices have a same network address and wherein port address of the network address and port address tuple is selected from a range of port address associated with the identified computing device; and
        configuring a network and port address translation component of the identified computing device with the determined network address and port address tuple, wherein the network and port address translation component is configured to associate a communication request initiated by one or more virtual machine instances hosted on the identified computing device with a port identifier information based on the determined network address and port address tuple, and wherein the port identifier information is translated to corresponding port address by another network and port address translation component.

15. The method as recited in claim 14, wherein the network address information corresponds to Internet Protocol address.

16. The method as recited in claim 14, wherein obtaining a network and port address configuration request includes obtaining an application programming interface call, the application programming interface call including the network and port address information for the set of computing devices.

17. The method as recited in claim 14, wherein configuring the network and port address translation component includes determining network address and port address tuples for each of the one or more virtual machine instances hosted on the identified host computing device.

18. The method as recited in claim 14, wherein the network address and port address tuples to be associated with the identified host computing device is determined by a local network and port address management component.

19. The method as recited in claim 14, wherein a port address of the network address and port address tuple is selected from a range of port addresses associated with the identified set of host computing devices.

20. The method as recited in claim 14, wherein the range of port addresses corresponds to a threshold number of simultaneous connections allowed for a specified computing device.

21. The method as recited in claim 20, wherein threshold number of simultaneous connections is determined at least in part by financial criteria.

* * * * *